UNITED STATES PATENT OFFICE 2,653,974

PROCESS FOR THE MANUFACTURE OF ORTHO-HYDROXYARYLCARBOXYLIC ACID-B-NAPHTHYLAMIDES

Alfred Hagenboecker, Basel, Switzerland, assignor to Ciba Limited, Basel, Switzerland, a Swiss firm No Drawing. Application May 28, 1951, Serial No. 228,781. In Switzerland June 8, 1950

11 Claims. (Cl. 260—560)

It is known that 2-aminonaphthalene (β-naphthylamine) has a detrimental action upon the health which may in some circumstances even when the greatest cleanliness is observed result from working with this substance for longer periods. It is therefore desirable to limit the use of 2-aminonaphthalene in chemical processes as far as possible.

The present invention is based on the observation that ortho-hydroxyarylcarboxylic acid-β-naphthylamides can be made by condensing an ortho-hydroxyarylcarboxylic acid with 2-aminonaphthalene-1-sulfonic acid. It is surprising that in carrying out this condensation without observing any special measures, for example, in working according to the known methods, the sulfonic acid group in the 1-position of the naphthalene nucleus is eliminated. Since 2-aminonaphthalene-1-sulfonic acid can be prepared without forming 2-aminonaphthalene as an intermediate product, for example, by treating 2-hydroxynaphthalene-1-sulfonic acid with ammonia, the process of the invention provides a method of obtaining commercially valuable ortho - hydroxyarylcarboxylic acid-β-naphthylamides in which it is not necessary to use 2-aminonaphthalene as an intermediate product.

As ortho-hydroxyaryl-carboxylic acids used as starting materials in the present process there may be used, for example, 2-hydroxybenzene-1-carboxylic acid, 2-hydroxycarbazole-3-carboxylic acid, 3-hydroxydiphenylene oxide-2-carboxylic acid and especially 2-hydroxynaphthalene-3-carboxylic acid. These ortho-hydroxyaryl carboxylic acids may if desired, be used in the form of their reactive functional derivatives, but advantageously as such or in the form of their salts, for example, their alkali metal salts. The 2-aminonaphthalene-1-sulfonic acid constituting the other reaction component may also be used as such or in the form of its salts, for example, the alkali metal salts.

The condensation may be carried out by methods in themselves known, for example, in inert solvents, for example, the homologues of benzene or the nuclear chlorinated or nitrated derivatives of benzene or its homologues, with or without the addition of acid-binding agents such as sodium carbonate, calcium carbonate, tertiary amines, for example, diethylaniline or dimethylaniline, or with the use of such amines as solvents.

If the ortho-hydroxyaryl-carboxylic acid is not used in the form of a previously prepared especially reactive derivative, for example, an acid chloride, it is necessary to add in known manner to the reaction mixture a condensing agent such as thionyl chloride, phosphorus pentachloride or especially phosphorus trichloride. The reaction is carried out at a raised temperature, for example, at 80–190° C., but advantageously at a temperature not exceeding 130° C., the desired temperature being attained by choosing a solvent of suitable boiling point or by working under pressure. In the present process it is also possible to use a proportion of phosphorus trichloride which is considerably less than the equimolecular amount, for example, in the proportion of about 0.4 mol of phosphorus trichloride for each mol of the other component.

The reaction mixture may be worked up in the usual manner, for example, by removing the volatile organic constituents by distillation with steam in a medium rendered alkaline with an alkali carbonate, and then filtering. By salting out or acidification, depending on the conditions employed, it is possible to obtain hydroxyarylcarboxylic acid-2-naphthylamide-1-sulfonic acids, although in subordinate quantities only.

By boiling the sulfonic acids with a mineral acid, for example, hydrochloric acid of 20 per cent. strength or sulfuric acid of 15 per cent. strength, the sulfo group can be easily split off. By carrying out the condensation at low temperatures a somewhat larger amount of the product containing a sulfonic acid group is obtained. The present process enables the commercially valuable 2-(2':3'-hydroxynaphthoylamino)-naphthalene to be made by a novel and commercially interesting method, and this result could not be foreseen.

The following examples illustrate the invention, the parts and percentages being by weight:

Example 1

100 parts of 2:3-hydroxynaphthoic acid and 118 parts of 2-aminonaphthalene-1-sulfonic acid are suspended in 800 parts of chlorobenzene and mixed with a solution of 42.2 parts of sodium hydroxide in 100 parts of water. 119 parts of water are then distilled off by azeotropic distillation, the whole is then cooled to 75° C. and 32 parts of phosphorus trichloride are run in at a temperature between 75° C. and 85° C. in the course of about 2 hours. In the course of a further 2 hours the mixture is raised to the boil and then boiled under reflux for 6 hours. By the addition of a solution of sodium carbonate the reaction mixture is then rendered distinctly alkaline to Brilliant Yellow paper, and the chlorobenzene is expelled with the steam. The residue remaining after the steam distillation is filtered with suction while hot, and the filter residue is washed with hot water until the washings no longer exhibit a coupling reaction with diazo compounds. The residue is dried and ground. It is 2-(2':3'-hydroxynaphthoylamino)-naphthalene of the formula

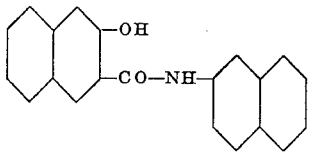

It dissolves well in an alcoholic solution of caustic soda and is equal in every way to the product obtained by condensing 2:3-hydroxynaphthoic acid with β-naphthylamine. The sulfonic acid group which has been split off can be detected in the mother liquor as sodium sulfate.

*Example 2*

100 parts of 2:3-hydroxynaphthoic acid and 118 parts of 2-aminonaphthalene-1-sulfonic acid are dissolved in 600 parts of dimethylaniline. 50 parts of dimethylaniline are then distilled off, the whole is cooled to 75° C. and 33 parts of phosphorus trichloride are added at a temperature between 75° C. and 85° C. in the course of 2 hours. The mixture is then raised to the boil in the course of 2 hours, and boiled under reflux for a further 3 hours. After the addition of sodium carbonate to produce a reaction distinctly alkaline due to the sodium carbonate, the dimethylaniline is expelled with steam, and the mixture is then filtered, washed and dried. The reaction product dissolves to a large extent in an alcoholic solution of caustic soda, from which by filtration and acidification 2-(2':3'-hydroxynaphthoylamino)-naphthalene can be isolated.

The residue which is insoluble in an alcoholic solution of caustic soda contains a by-product. It is recrystallized well from an organic solvent and by analysis consists of 2:2'-dinaphthylamine-carboxyl-2'-naphthylamine of the constitution

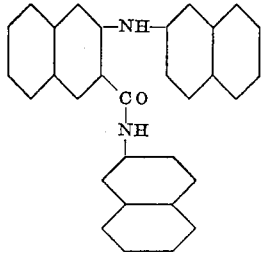

which couples with diazotized para-nitraniline to form a blue-violet dyestuff.

The product may be worked up by pouring the reaction mixture, after the condensation, into a quantity of dilute hydrochloric acid sufficient to dissolve the dimethylaniline. The residue which remains behind is then separated by filtration, washed and extracted at the boil with sodium carbonate solution.

*Example 3*

100 parts of 2:3 hydroxynaphthoic acid and 118 parts of 2-aminonaphthalene-1-sulfonic acid are suspended in 600 parts of toluene, and mixed with a solution of 42.4 parts of sodium hydroxide in 50 parts of water. 150 parts of anhydrous sodium carbonate are then added, and the whole is distilled under reflux with the separation of water until about 69 parts of water have been eliminated and the reaction mixture has attained a temperature of 111° C. The whole is then cooled to 75° C. and 69 parts of phosphorus trichloride are added in about 2 hours at a temperature between 75° C. and 80° C. In the course of a further 2 hours the whole is gradually heated to the boiling temperature and boiled under reflux for 8 hours. The reaction mixture is then mixed with a solution of sodium carbonate until the reaction remains alkaline, and freed from toluene by steam distillation. It is remarkable that the distillate from the steam distillation contains β-naphthylamine and it is advisable in order to render the reaction product non-poisonous to continue to introduce steam after the toluene has been removed. The distillation residue is separated by filtration while hot, and washed neutral while hot and dried.

*Example 4*

100 parts of 2:3-hydroxynaphthoic acid and 118 parts of 2-aminonaphthalene-1-sulfonic acid are suspended in 600 parts of toluene and mixed at 75° C. to 85° C. with 32 parts of phosphorus trichloride in the course of 1–2 hours. The whole is slowly brought to the boil and boiled under reflux for 8 hours. The mass is then rendered distinctly alkaline with sodium carbonate solution and the toluene is expelled with steam. 2-(2':3'-hydroxynaphthoylamino)-naphthalene remains behind in the form of a residue insoluble in hot sodium carbonate solution, which residue is isolated by filtering with suction and washing with hot water.

*Example 5*

74 parts of salicylic acid and 119 parts of 2-aminonaphthalene-1-sulfonic acid are stirred in 500 parts of toluene. A solution of 42.6 parts of sodium hydroxide in 50 parts of water is added and then 150 parts of anhydrous sodium carbonate are added. 69 parts of water are distilled off azeotropically. 69 parts of phosphorus trichloride are added at 75° C. to 80° C. in the course of 2 hours, and then the reaction mixture is boiled under reflux for several hours. The whole is then neutralized with medium carbonate solution and the toluene is distilled off by steam distillation. Small quantities of 2-amino-naphthalene pass over. The whole is cooled to room temperature and 2-(2'-hydroxybenzoylamino)-naphthalene of the formula

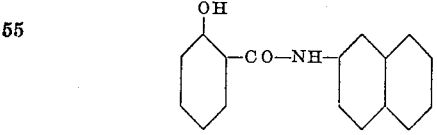

is obtained as a residue.

*Example 6*

221 parts of 2-aminonaphthalene-1-sulfonic acid are suspended in 1500 parts of chlorobenzene and a solution of 40 parts of sodium hydroxide in 100 parts of water is added. After stirring until the sodium salt of the 2-aminonaphthalene 1-sulfonic acid is formed, 100 parts of anhydrous sodium carbonate (or a quantity between about 60 and 110 parts) are added. By azeotropic distillation the water is removed. The suspension, which then boils at about 135° C., is cooled to 75–80° C. and at this temperature 207 parts of 2-hydroxy-3-naphthoyl chloride are added. The reaction mixture is slowly heated to 130° C. and boiled with reflux cooling until no more carbon dioxide escapes and cooled down to below 100° C. After the addition of 200 parts of water the chlorobenzene is distilled off with steam, the contents of the still being checked before, and at intervals during, the distillation to make sure that there is an excess of sodium carbonate. If necessary, sodium carbonate is added.

The hot aqueous distillation residue is filtered and washed with water until the filter residue is of neutral reaction and the wash water no longer contains components capable of coupling with diazotized para-nitraniline. The filter residue is 2 - (2':3' - hydroxynaphthoyl - amino) - naphthalene.

It is possible to isolate from the filtrate a small amount of 2-(2':3'-hydroxynaphthoyl-amino)-naphthalene-1-sulfonic acid. The sulfonic acid group split off during the above reaction is found in the filtrate as sodium sulfate.

What is claimed is:

1. A process for the manufacture of ortho-hydroxyaryl carboxylic acid-β-naphthylamides which comprises heating in an indifferent diluent to a temperature above about 75° C. substantially one molecular proportion of an ortho-hydroxy aryl carboxylic acid chloride free from further substituents with substantially one molecular proportion of 2-aminonaphthalene-1-sulfonic acid, and recovering the β-naphthylamide free from sulfonic acid groups thus formed.

2. A process for the manufacture of ortho-hydroxyaryl-carboxylic acid-β-naphthylamides, which comprises heating in an indifferent diluent to a temperature above about 75° C. substantially one molecular proportion of an ortho-hydroxy-aryl-carboxylic acid free from further substituents in the presence of at least about 0.4 molecular proportion of an inorganic phosphorus chloride with substantially one molecular proportion of 2-aminonaphthalene-1-sulfonic acid, and recovering the β-naphthylamide free from sulfonic acid groups thus formed.

3. A process for the manufacture of ortho-hydroxyaryl-carboxylic acid-β-naphthylamides which comprises heating in an indifferent diluent to a temperature above about 75° C. substantially one molecular proportion of an ortho-hydroxy-aryl-carboxylic acid free from further substituents in the presence of at least about 0.4 molecular proportion of phosphorus trichloride with substantially one molecular proportion of 2-aminonaphthalene-1-sulfonic acid and recovering the β-naphthylamide free from sulfonic acid groups thus formed.

4. A process according to claim 2 wherein the formation of the naphthylamide is effected in the presence of an acid-binding agent.

5. A process according to claim 3 wherein the formation of the naphthylamide is effected in the presence of an acid-binding agent.

6. A process according to claim 2 wherein the formation of the naphthylamide is effected in the absence of an acid-binding agent.

7. A process for the manufacture of 2-(2':3'-hydroxy-naphthoyl)-aminonaphthalene which comprises heating in an indifferent diluent to a temperature above about 75° C. substantially one molecular proportion of 2-hydroxynaphthalene-3-carboxylic acid chloride with substantially one molecular proportion of 2-aminonaphthalene-1-sulfonic acid, and recovering the β-naphthylamide free from sulfonic acid groups thus formed.

8. A process for the manufacture of 2-(2':3'-hydroxy-naphthoyl)-aminonaphthalene which comprises heating in an indifferent diluent to a temperature above about 75° C. substantially one molecular proportion of 2-hydroxynaphthalene-3-carboxylic acid in the presence of at least about 0.4 molecular proportion of phosphorus trichloride with substantially one molecular proportion of 2-amino-naphthalene-1-sulfonic acid, and recovering the β-naphthylamide free from sulfonic acid groups thus formed.

9. A process according to claim 8 wherein the formation of the naphthylamide is effected in the presence of an acid-binding agent.

10. A process according to claim 8 wherein the formation of the naphthylamide is effected in the absence of an acid-binding agent.

11. A process according to claim 8 wherein the 2-hydroxy-naphthalene-3-carboxylic acid and the 2-amino-naphthalene-1-sulfonic acid are in the form of the sodium carboxylate and sulfonate, respectively.

ALFRED HAGENBOECKER.

No references cited.